United States Patent [19]

Leach

[11] Patent Number: 4,952,302
[45] Date of Patent: Aug. 28, 1990

[54] VAPOR/LIQUID DISTRIBUTOR AND USE THEREOF

[75] Inventor: Lyle A. Leach, Ewing, N.J.

[73] Assignee: Mobil Oil Corporation, New York, N.Y.

[21] Appl. No.: 249,800

[22] Filed: Sep. 27, 1988

[51] Int. Cl.$^5$ .............................................. B01J 8/02
[52] U.S. Cl. ...................................... 208/85; 208/12; 422/106; 422/220
[58] Field of Search ................... 208/85, 92, 108, 166, 208/DIG. 1; 422/106, 193, 217, 220; 210/323.1, 340; 202/181; 203/1

[56] References Cited

U.S. PATENT DOCUMENTS

| | | | |
|---|---|---|---|
| 2,439,372 | 4/1948 | Simpson | 208/166 |
| 2,776,930 | 1/1957 | McKeague et al. | 208/162 |
| 2,860,955 | 11/1958 | Kassel | 23/288 |
| 3,227,701 | 1/1966 | Pennington | 260/94.7 |
| 3,363,992 | 1/1968 | Chervenak | 422/106 |
| 3,441,498 | 4/1969 | Jubin, Jr. et al. | 208/143 |
| 3,533,754 | 10/1970 | Hallman | 422/220 |
| 3,992,282 | 11/1976 | Grosboll et al. | 210/340 |
| 4,111,814 | 9/1978 | Knigge | 210/323.2 |
| 4,235,847 | 11/1980 | Scott | 208/146 |
| 4,341,739 | 7/1982 | Ellis et al. | 422/207 |
| 4,544,788 | 10/1985 | Daviduk et al. | 585/501 |
| 4,550,012 | 10/1985 | Penick | 422/106 |
| 4,579,647 | 4/1986 | Smith | 208/111 |
| 4,755,281 | 7/1988 | Penick | 208/146 X |

OTHER PUBLICATIONS

Industrial Catalog 27, Spraying Systems Co, Wheaton, Illinois.

*Primary Examiner*—Glenn Caldarola
*Assistant Examiner*—William C. Diemler
*Attorney, Agent, or Firm*—Alexander J. McKillop; Charles J. Speciale; Richard D. Stone

[57] ABSTRACT

A vapor/liquid separator and liquid distributor which is especially suitable for small catalytic hydrodewaxing reactors is disclosed. A mixed phase stream is discharged into a V/L separator above a vessel. A liquid level is maintained in the V/L separator using a liquid level controller. Preferably the liquid is filtered, then passed through a spray nozzle for distribution over a fixed bed of contact material in the vessel, e.g., catalyst. The vapor phase from the V/L separator is added to the top of the reactor. The process and apparatus is especially useful in catalytic hydrodewaxing.

16 Claims, 3 Drawing Sheets

VIEW A-A

INLET

VAPOR/LIQUID DISTRIBUTOR AND USE THEREOF

BACKGROUND OF THE INVENTION

1. Field of the Invention

This process relates to catalytic reactors having concurrent multiphase reactant feeds. In particular, it relates to a method and apparatus for separating liquid and gaseous phases and distributing the reactants downflow uniformly onto a bed of catalyst particles.

2. Background of the Invention

In the treatment of hydrocarbons or other organic materials in a petroleum refinery or petrochemical complex, various catalytic processes are employed; for instance, hydrocracking with zeolite catalyst, hydrodesulfurization with Co, Ni and/or Mo catalysts, etc. Often, these processes are carried out in a fixed bed reactor, with multi-phase reactant feedstock mixtures being introduced at an upper reactor inlet for downward co-current flow over the catalyst bed.

In prior reactors, distribution of liquid has been achieved with a horizontal tray or the like mounted within the reactor shell, with perforations, weirs, or multiple conduits for uniformly spreading the liquid over the catalyst bed.

A typical reactor shell has a cylindrical configuration with vertical axial flow; although other reactors may also be employed, such as elongated polygonal or spheroidal shells. Pressure vessels in catalytic hydrogenation processes usually must withstand high pressures, and thus, are constructed to withstand internal pressures of several atmospheres up to hundreds, depending upon the desired pressure of reactant gas. A typical hydrogenation reactor may be constructed of welded 304 stainless, carbon steel or the like.

Retrofitting of catalytic reactors is desirable when a chemical manufacturing complex is altered to accommodate different processes. Many general-purpose pressurized reactors are constructed of welded steel with a length:diameter ratio (L:D) of about 2:1 to 10:1, preferably 4:1 to 6:1. These reactors may be enclosed at top and bottom with bolted or welded hemispheroidal end sections. Fluid inlet and outlet ports, maintenance access holes, and other openings for piping, instrumentation, etc. are provided.

Input gas and liquid reactants may be introduced at the top of the reactor in a mixed stream through a simple inlet conduit, and flow downwardly through the porous reactor bed. In order to maintain homogenous flow throughout the horizontal cross-sectional reactor area, the reactants are distributed over the surface of the catalyst bed. In some prior art reactors, such as disclosed in U.S. Pat. No. 4,126,539 (Derr et al) or in U.S. Pat. No. 3,218,249 (Ballard et al), a distributor tray is mounted over the catalyst bed for receiving vapor and liquid reactants for distribution. While internal arrangements of this type may be satisfactory for original equipment installations, they are difficult to install in pre-existing reactor shells. This difficulty is due to weakening of the reactor shell during welding or other installation techniques. Although it is technically possible to field weld internal distributor components and anneal the structure to retain integrity of the pressure vessel, such modifications are expensive and time-consuming.

Reactor modifications for petrochemical plants may require altering a single-phase system for multi-phase processes or other internal structural changes and/or repiping. Such modifications to existing equipment may expedite process changeover or decrease cost on a new process installation. Known flow nozzle designs are adequate for single phase liquid or gas distribution or when high pressure drop is permissible. However, it has been found that low pressure drop distributors for mixed gas and liquid feed in cocurrent reactors are extremely difficult to install.

Sometimes when smaller reactors are used, there are additional complications. Smaller liquid flows present a more challenging problem of flow distribution within a reactor than do large liquid flows. This is because with conventional pipe distributors, with holes drilled in them, the holes must be of such small size to ensure adequate flow distribution that the holes plug easily. The foraminous distributor of U.S. Pat. No. 4,579,647 which is incorporated by reference, is a good distributor design for retrofitting in existing vessels, but not so good for use in reactors where plugging of holes in the distributor is a problem.

There is still a need for a vapor/liquid distributor which can be retrofitted into existing reactors, and which will be suitable for use even in small reactors, or in any reactors with relatively low liquid flows, or when the liquid stream is likely to coke or have particulate matter in it which would cause plugging of conventional pipe distributors.

A way has now been discovered to achieve satisfactory liquid distribution in such two phase reactors.

BRIEF SUMMARY OF THE INVENTION

Accordingly, the present invention provides a process for contacting a mixed phase, vapor-liquid stream with a bed of contact material in a closed vessel comprising passing a two phase vapor/liquid stream into an external vapor/liquid separator located at an elevation above the closed vessel; separating the two phase stream in the separator into a vapor phase and a liquid phase; allowing the liquid phase to accumulate in the separator and form a pool having a liquid level and controlling the liquid level by use of a liquid level control means; discharging liquid down from the separator to a distributor means located inside the closed vessel and above the bed of contact material; discharging vapor from the separator via a vapor discharge line into the closed vessel above the bed of contact material.

In another embodiment, the present invention provides an apparatus for contacting a mixed phase, vapor-liquid stream with a bed of contact material in a closed vessel comprising an external vapor/liquid separator located at an elevation above the closed vessel; having a vapor/liquid inlet, a liquid outlet and a vapor outlet and a liquid level control means for controlling a liquid level in the external separator by control of liquid flow through the liquid outlet; a liquid flow line means connective with the separator liquid outlet and a liquid distributor means located inside the closed vessel; a vapor phase flow line means connective with the separator vapor outlet and a vapor inlet to the closed vessel above the bed of contact material.

DETAILED DESCRIPTION

Figure 1:
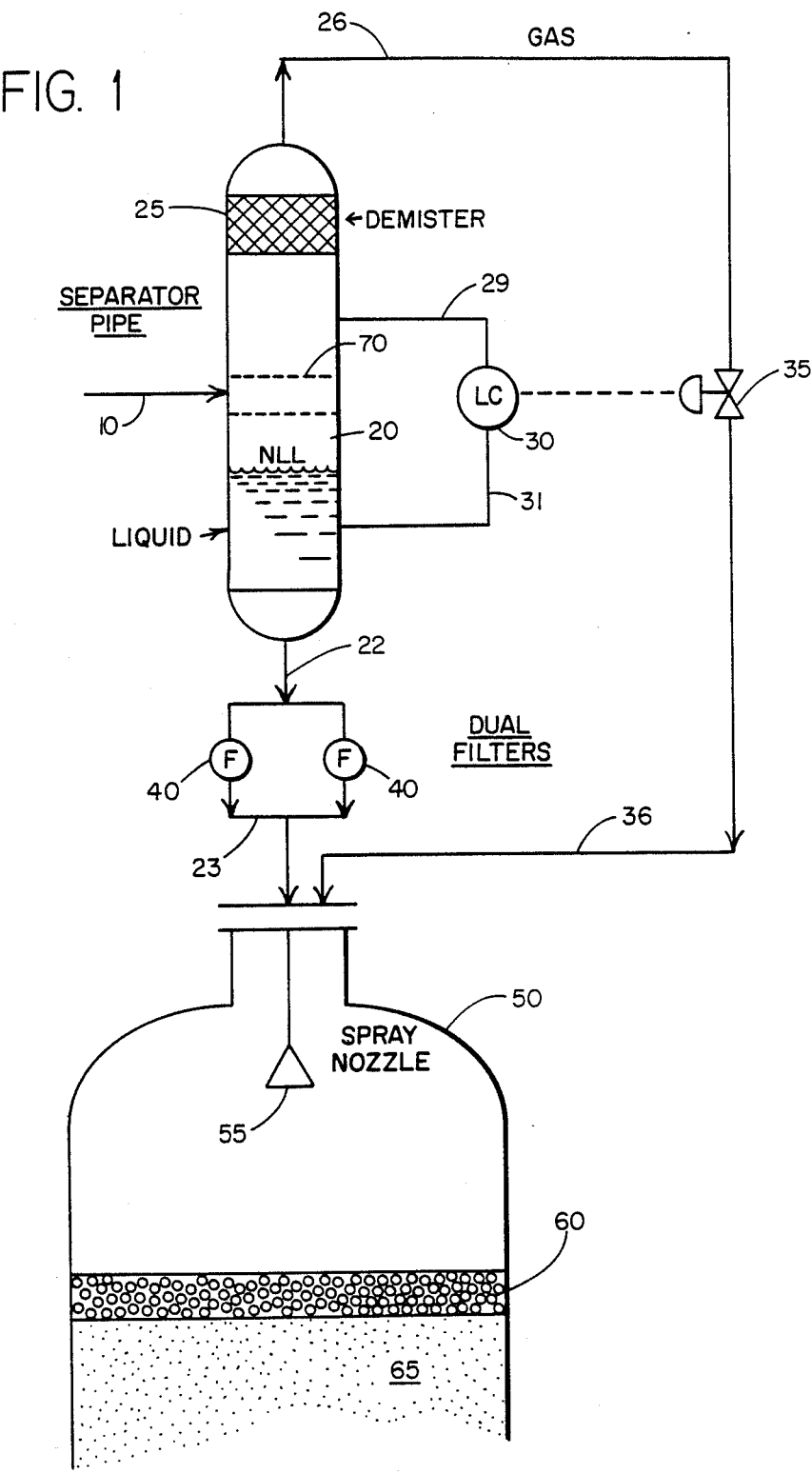
FIG. 1 is a vertical cross-sectional view of a catalytic reactor showing the phase separator/liquid distributor system of the present invention.

A typical reactor used for catalytic conversion in the petrochemical refining industries is shown in FIG. 1, including a steel reactor shell 50 in the form of a vertical cylinder.

A mixed phase feed in line 10 enters the vapor liquid separator 20 mounted above the reactor shell 50. In V/L separator 20 the two phase feed contacts inlet deflector 70, shown in more detail in FIG. 3, which performs an initial, rough separation of vapor and liquid phases.

Vapor rises to the top of the vessel, passes through demister 25, e.g., a Yorkmesh demister, and is removed via line 26. Liquid collects in the bottom of V/L separator 20 and forms a pool therein. Pressure taps 29 and 31 operate in conjunction with liquid level controller 30 to monitor and control the liquid level at a desired point, shown as the normal liquid level, NLL, in FIG. 1. Liquid is withdrawn from the bottom of V/L separator 20 via line 22 and preferably passes through dual filters 40 and then via line 23 to spray nozzle 55 mounted above the fixed bed of catalyst 65 in reactor 50. Flow through the filters and spray nozzles is controlled by level controller 30.

Liquid flow is preferably actively controlled so that the system works well despite changes in pressure drop across the filter/liquid distributor system. There is always a pressure drop associated with a liquid passing through a pipe and associated filtering equipment and spray nozzles. The pressure drop can be low if using relatively large pipes, low pressure drop filters and relatively large spray nozzles which operate with relatively low pressure drops. Pressure drop will increase with smaller sized equipment, dirty filters and clogged sprayers. The pressure required to get the liquid through the filters and spray nozzles preferably is supplied both from hydrostatic head associated with the liquid level, and from the difference in pressure between separator 20 and reactor 50. This pressure difference can be controlled by level control valve 35 which allows more or less gas out of V/L separator 20 in response to the liquid level therein. If the liquid level is too high, LLC 30 will send a signal to LCV 35 to close, causing pressure in separator 20 to rise. This increased pressure will increase the flow rate of liquid from vessel 20 through the filters and spray nozzle into reactor vessel 50. This increased liquid flow will reduce the liquid level in the separator. If the liquid level in separator 20 is too low then LLC 30 will send a signal to CV 35 causing it to open, allowing gas to pass freely into reactor 50 via line 36 and reduce the pressure difference between vessel 20 and vessel 50. This reduced pressure differential will reduce liquid flows.

Although not shown in the drawing a number of equivalent control schemes can be used, such as attaching one or more manual or automatic control valves to the liquid flow lines 22 or 23 to allow fine tuning of the system. It is also possible to eliminate the vapor flow control valve and operate solely with control of liquid flows. This will mean that the filters and spray nozzles will have to be sized with a pressure drop low enough to permit their operation solely with liquid head to generate the head needed to achieve satisfactory liquid flow through the filters and spray nozzle.

Although not shown in the drawing it is also possible, and desirable in many instances, to provide additional gas bypassing means around the separator into the reactor, e.g., a bypass line allowing gas to flow from the top of line 10 directly into the reactor.

In reactor 50 the liquid feed is distributed via spray nozzle 55. The liquid is sprayed down onto catalyst bed 65, which is preferably a fixed bed of catalyst.

Spray angles of 112°–120° can be achieved with 5 psi pressure drop across the nozzles. More details regarding pressure drop and achievable spray angles are provided in *Industrial Catalog* 27, of Spraying Systems Company, Wheaton, IL. Type HH nozzles are preferred.

It is preferred to have a bed of relatively inert material 60 above bed 65, to assist some in achieving better liquid distribution and allow a relatively inexpensive contact material such as inert alumina balls 60 to be plugged rather than more expensive catalyst should any plugging occur.

Figure 2:
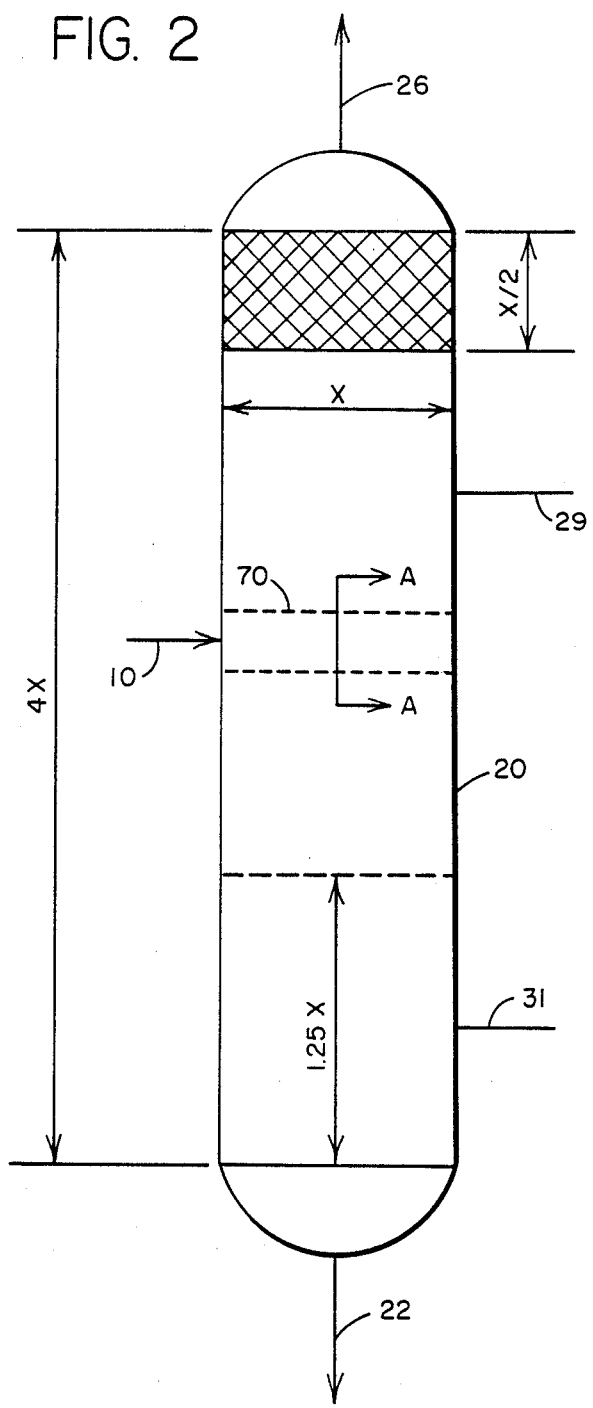
FIG. 2 is a cross-sectional view of the vapor/liquid separator.

FIG. 2 provides more details of the vapor/liquid separator provided above the reactor.

The preferred dimensions of the V/L separator are shown. The vessel is preferably four times as tall as it is wide, with the height being shown as 4X and the width shown as X. The demister, or equivalent means, preferably is present in a thickness equal to one half of the reactor diameter on small reactors, e.g., up to about two feet in diameter. Usually a demister thickness of 6–12" is preferred. The liquid bed which accumulates as a pool in the bottom of vessel 20 preferably has a liquid height slightly more than 1 times the diameter of the vessel. The liquid level shown in FIG. 1 and FIG. 2 is about 1.25 times the vessel diameter, as measured above the bottom head weld seam.

Figure 3:
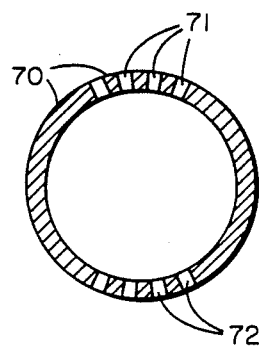
FIG. 3 is a fragmentary view of a perforated pipe inlet to the vapor/liquid separator.

FIG. 3 shows one method of getting the vapor-liquid mixture into vessel 20, while achieving some measure of separation. A perforated pipe 70 is used. Holes 71 at the top discharge vapor, while holes 72 at the bottom discharge liquid.

Figure 4:
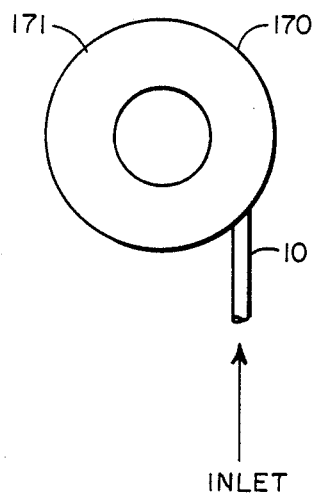
FIG. 4 is a plan view of a preferred cyclone inlet to the separator.
Figure 4A:
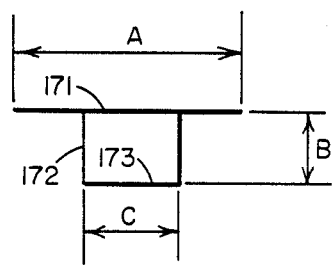
FIG. 4A is an elevation view of the separator of FIG. 4.

FIG. 4 is a plan and FIG. 4A is an elevation view of the preferred inlet separator, functioning much as a cyclone separator to achieve a rapid and efficient separation of vapor from liquid in the separator pipe. The cyclone separator 170 will placed at the same location as element 70, shown in FIG. 1. Cyclone separator 170 looks much like an inverted hat, with the bottom of the hat punched out. The top of the hat comprises an annular closed portion 171 and an elongated, vertical cylinder 172 connective with annular plate 171. The outer diameter of annular plate 171 should equal the inner diameter of the separator pipe.

The preferred dimensions of the inlet separator 170, are shown as A, B, and C in the drawing are:

$$A = X$$

$$B = X/2$$

$$C = (3X)/4$$

where X = the inner diameter of separator 20.

Figure 5:
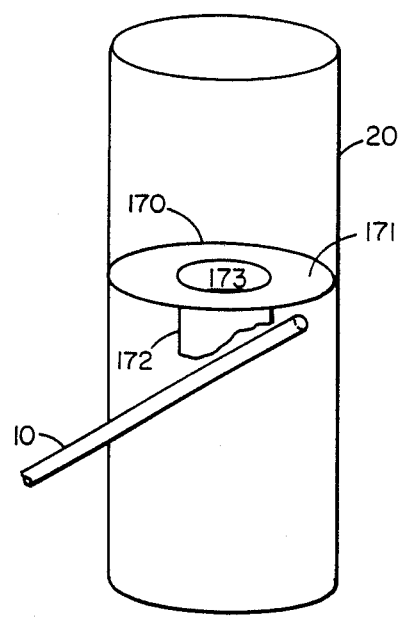
FIG. 5 is a perspective view of the preferred cyclone inlet.

FIG. 5 is a simplified, perspective drawing of the preferred inlet distributor 170. This distributor, per se, is not my invention.

Vapor and liquid targentially enter vessel 20 via line 10. Liquid is thrown to the walls of vessel 20 by centrifugal force. The vapor enters opening 173 defined by open-ended cylinder 172. Vapors are forced into opening 173 because annular baffle 171 prevents direct flow of vapor up from line 10.

When processing heavy hydrocarbon feedstocks, e.g., dewaxing heavy gas oils containing sulfur and nitrogen contaminents, it is preferred to use 316 stainless steel for the mesh demister, and for any other parts where corrosion might be a problem.

For small reactors, a very good design is achieved by using a 12 inch pipe, 48 inches long, as the linear or vertical portion of vessel 20. Inlet 70 can be fashioned from a length of 3 inch schedule 40 pipe, with holes 71, 72 of ¼-1", depending on flows, and the number of holes.

A filter/strainer, operating with a delta P of 1-2 psi is preferrably used to remove particles with a diameter which could plug the spray nozzle.

I claim:

1. A process for contacting a mixed phase, vapor-liquid stream with a bed of contact material in a closed vessel comprising
   (a) passing a two phase vapor/liquid stream into an external vapor/liquid separator located at an elevation above the closed vessel;
   (b) separating the two phase stream in the separator into a vapor phase and a liquid phase;
   (c) allowing the liquid phase to accumulate in the separator and form a pool having a liquid level and controlling the liquid level by use of a liquid level control means;
   (d) discharging liquid down from the separator to a distributor means located inside the closed vessel and above the bed of contact material;
   (e) discharging vapor from the separator via a vapor discharge line into the closed vessel above the bed of contact material and wherein there is a difference in pressure between the separator and the closed vessel and the liquid level in the external separator is controlled by changing the difference in pressure by controlling the vapor flow from the external separator to the closed vessel.

2. The process of claim 1 wherein liquid level control of the liquid pool in the external vapor/liquid separator is achieved by opening or closing a liquid flow control valve intermediate the separator and the flow distributor means within the closed vessel.

3. The process of claim 1 wherein a filter means is provided intermediate the liquid level and the distributor means.

4. The process of claim 3 wherein the filter means comprises at least two filters operating in parallel.

5. The process of claim 1 wherein the liquid distributor means inside the closed vessel comprises at least one spray nozzle.

6. The process of claim 1 wherein an inlet vapor/liquid separation means is provided at the inlet to the external vapor/liquid separator.

7. The process of claim 6 wherein the inlet separator comprises a horizontal length of pipe with holes ¼"-1" provided at upper and lower portions of the pipe.

8. The process of claim 1 wherein the liquid stream is a wax containing hydrocarbon and the closed vessel contains hydrodewaxing catalyst.

9. An apparatus for contacting a mixed phase, vapor-liquid stream with a bed of contact material in a closed vessel comprising
   (a) an external vapor/liquid separator located at an elevation above the closed vessel; said separator having a vapor/liquid inlet, a liquid outlet and a vapor outlet; and a liquid level control means for controlling a liquid level in the external separator by control of liquid flow through the liquid outlet;
   (b) a liquid flow line means connective with the separator liquid outlet and a liquid distributor means located inside the closed vessel;
   (c) a vapor phase flow line means connective with the separator vapor outlet and a vapor inlet to the closed vessel above the bed of contact material, and said vapor phase flow line means comprises a vapor flow control means adaptive to control vapor flow from said external separator to said closed vessel and create a change in a difference in pressure between the external separator and the closed vessel, and the liquid level in the external separator is controlled by changing the difference in pressure by controlling the vapor flow from the external separator to the closed vessel.

10. The apparatus of claim 9 wherein liquid level control of the liquid pool in the external vapor/liquid separator is achieved by opening or closing a liquid flow control valve intermediate the separator and the flow distributor means within the closed vessel.

11. The apparatus of claim 9 wherein a filter means is provided intermediate the liquid level and the distributor means.

12. The apparatus of claim 11 wherein the filter means comprises at least two filters operating in parallel.

13. The apparatus of claim 9 wherein the liquid distributor means inside the closed vessel comprises at least one spray nozzle.

14. The apparatus of claim 9 wherein an inlet vapor/liquid separation means is provided at the inlet to the external vapor/liquid separator.

15. The apparatus of claim 14 wherein the inlet separator comprises a horizontal length of pipe with holes ¼"-1" provided at upper and lower portions of the pipe.

16. The apparatus of claim 9 wherein the closed vessel contains hydroewaxing catalyst.

* * * * *